United States Patent [19]

Aldrich et al.

[11] 4,452,708

[45] Jun. 5, 1984

[54] OIL RECOVERY METHOD USING SULFONATE SURFACTANTS DERIVED FROM EXTRACTED AROMATIC FEEDSTOCKS

[75] Inventors: Haven S. Aldrich, Seabrook; Thomas L. Ashcraft, Jr., Baytown; Maura C. Puerto; Ronald L. Reed, both of Houston, all of Tex.

[73] Assignee: Exxon Production Research Co., Houston, Tex.

[21] Appl. No.: 349,952

[22] Filed: Feb. 18, 1982

[51] Int. Cl.$^3$ .............................................. E21B 43/22
[52] U.S. Cl. ................................. 252/8.55 D; 166/275
[58] Field of Search .................. 252/8.55 D; 166/275, 166/270

[56] References Cited

U.S. PATENT DOCUMENTS

| | | | |
|---|---|---|---|
| 2,260,279 | 10/1941 | D'Ouville et al. | 196/9 |
| 2,338,711 | 1/1944 | D'Ouville et al. | 260/671 |
| 2,398,563 | 4/1946 | Smith et al. | 260/671 |
| 2,456,119 | 12/1948 | Friedman et al. | 260/505 |
| 2,691,563 | 10/1954 | Gomery | 260/639 |
| 3,498,379 | 3/1970 | Murphy | 166/275 |
| 3,861,466 | 1/1975 | Gale | 166/273 |
| 3,878,894 | 4/1975 | Clark et al. | 166/270 |
| 3,952,803 | 4/1976 | Kerfoot et al. | 166/270 |
| 3,965,984 | 6/1976 | Clark et al. | 166/270 |
| 4,293,428 | 10/1981 | Gale et al. | 252/8.55 D |

OTHER PUBLICATIONS

Puerto, M. and Reed, R.; *A Three-Parameter Representation of Surfactant-Oil-Brine Interaction;* 1982 SPE/DOE Third Symposium on Enhanced Oil Recovery of the Society of Petroleum Engineers, Tulsa, Okla.; Apr. 1982.

Malmberg, E., Gajderowicz, C., Martin, F., Ward, J., Taber, J.; *Characterization and Oil Recovery Observations on a Series of Synthetic Petroleum Sulfonates,* Society of Petroleum Engineers Journal 226, Apr. 1982.

*Primary Examiner*—Christine M. Nucker
*Attorney, Agent, or Firm*—Karen T. Burleson

[57] ABSTRACT

An oil recovery method is disclosed which uses a particular class of alkylaryl sulfonate surfactants. The surfactants are derived from an extracted aromatic feedstock consisting essentially of benzene, toluene, xylenes, and lesser amounts of ethylbenzene, trimethylbenzenes, and tetramethylbenzenes. The aromatic feedstock is then alkylated with linear α-olefins to favor second-carbon attachment, and sulfonated to result in surfactants having high oil solubilization parameters and whose phase behavior is substantially independent of temperature over 120°–250° Fahrenheit.

13 Claims, 2 Drawing Figures

OIL RECOVERY METHOD USING SULFONATE SURFACTANTS DERIVED FROM EXTRACTED AROMATIC FEEDSTOCKS

1. BACKGROUND OF THE INVENTION

This invention relates to the preparation and use of alkylaryl sulfonates to be used with flooding techniques to improve the oil displacement efficiency of waterfloods.

2. DESCRIPTION OF THE PRIOR ART

The petroleum industry has recognized for many years that the natural formation energy of a petroleum reservoir will produce only a portion of the crude oil originally in the reservoir. Waterflooding has been commonly used to enhance the recovery. In waterflooding, water or other aqueous fluid is introduced through injection wells to drive oil through the reservoir to offset producing wells. Such flooding, however, is inefficient leaving behind in the reservoir more than half of the original reservoir crude oil. The reason for this is that much of the oil that is retained in the reservoir after a typical waterflood is in the form of discontinuous globules or discrete droplets which are trapped within the pore spaces of the reservoir. The normal interfacial tension between the reservoir oil and water used for flooding is so high that these discrete droplets are unable to deform sufficiently to pass through narrow constrictions in the pore channels of the formation.

Surface-active agents or surfactants have been found to reduce or lower the interfacial tension between the water and reservor oil so that the oil droplets may deform, coalesce and flow with the flood water toward producing wells. Often, surfactants are used in preparing microemulsions for injection as the flooding medium. A microemulsion is a stable, transparent (or translucent) micellar solution of oil, water, and a surfactant, and optionally one or more electrolytes.

One class of surfactants commonly used for oil recovery are those of the class known as hydrocarbon sulfonates. They are typically sulfonates of alkylaryl hydrocarbons which are prepared by sulfonating alkylaryl fractions synthesized in various chemical operations, including petrochemical or refining operations. Sulfonates so prepared may also be called alkylaryl sulfonates. The sulfonates prepared from sulfonating fractions from crude oil or refinery streams are sometimes called "petroleum sulfonates" and are a particular class of hydrocarbon sulfonates. An example of a patent pertaining to the preparation of hydrocarbon sulfonates in general is U.S. Pat. No. 2,456,119 to Friedman, issued Dec. 14, 1948. An example of a patent pertaining to the preparation of petroleum sulfonates particularly is U.S. Pat. No. 2,691,687 to Gomery, issued Dec. 28, 1951.

Numerable patents disclose methods of using hydrocarbon sulfonates in enhanced oil recovery. Examples of such patents include U.S. Pat. Nos. 3,498,379 to Murphy, issued Mar. 3, 1970; 3,861,466 to W. W. Gale, issued Jan. 1, 1975; 3,878,894 to Clark et al., issued Apr. 22, 1975; 3,965,984 to Clark et al., issued June 29, 1976; and 3,952,803 to Clark et al, issued Apr. 27, 1976.

A problem with using any surfactant in waterflooding processes for the recovery of oil is that the efficiency of the oil displacement is strongly affected by the surfactant's surface activity, or the extent of the surfactant's lowering of the oil-water interfacial tension. Many surfactants are unable to exhibit high surface activity at temperatures as high as or higher than about 120° Fahrenheit and/or in aqueous solutions containing concentrations of inorganic salts as high as or higher than 2 percent soldium chloride (NaCl) and over 0.5 percent calcium chloride ($CaCl_2$) and magnesium chloride ($MgCl_2$). Many oilfield reservoirs have such high temperatures and inorganic salt concentrations. In fact, it would not be unusual for reservoir brine to have concentrations of over 4 percent NaCl and 2 percent $CaCl_2$ and $MgCl_2$. (All percentages reported herein are percents by weight unless otherwise noted.) Other problems include poor phase behavior of the flooding medium upon flow through a formation and a generally lower ability to displace oil as the temperature of the formation increases.

While hydrocarbon sulfonates generally demonstrate better surface activity in reservoir conditions than do many other commonly known surfactants such as detergents, they can be prohibitively expensive to use in quantities as large as often needed. One factor contributing to such expense is the cost and general lack of availability of substantial quantities of pure aromatics, such as benzene, used in making the sulfonates. In addition, while petroleum sulfonates are generally more suited to use in higher temperatures, they do not have uniformly good phase behavior and oil solubilization properties as formation temperature increases.

SUMMARY OF THE INVENTION

The present invention relates to a flooding process for recovering oil from a subterranean formation having high temperatures (120°–250° Fahrenheit). The process is especially useful when the formation temperature varies. These benefits are achieved by using a particular class of alkylaryl sulfonate surfactants whose phase behavior properties are substantially independent of temperature over a wide range (120°–250° Fahrenheit). These surfactants have uniformly high oil solubilization parameters ($V_o/V_s$) over the high temperature range, which enables superior oil displacement when these surfactants are incorporated into a flooding medium.

The surfactants are derived from a purified mixture of aromatic compounds consisting essentially of benzene, toluene, xylenes, and lesser amounts of ethylbenzene, trimethylbenzenes, and tetramethylbenzenes. The surfactants are prepared by first alkylating the aromatic mixture using a Friedel-Crafts process, and then sulfonating the product by treatment with gaseous $SO_3$ followed by base neutralization. The purified mixture may conveniently be obtained by extraction of a naphtha stream taken from a refinery, and will occasionally be referred to herein as "AXU Aromatics". The sulfonate surfactant may similarly be referred to as "AXU Sulfonates".

DESCRIPTION OF THE PREFERRED EMBODIMENT

Figure 1:
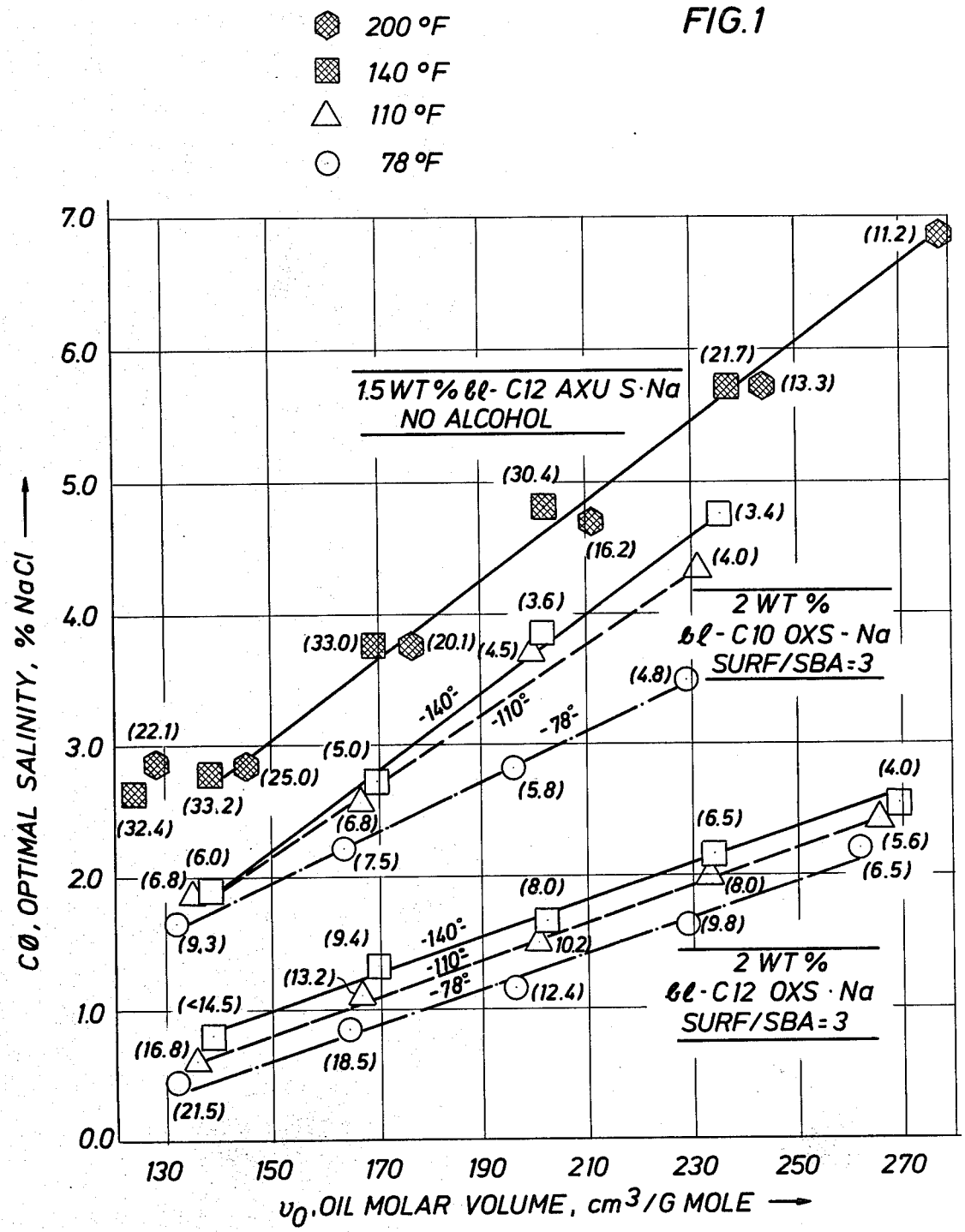
FIG. 1 is a plot illustrating the optimal salinities and solubilization parameters of an AXU Sulfonate and two conventional alkylaryl sulfonates for a range of oils at several different temperatures.

The benefits and advantages which can be obtained in the practice of this invention are achieved through the use of alkylaryl sulfonates prepared by the process described below from a purified aromatic feedstock derived from naphtha streams. These sulfonates ("AXU Sulfonates") can be used in any type of surfactant flooding process for recovering crude oil from a petroleum reservoir. They are economical for use in oil recovery processes requiring large quantities of surfactants, and they are particularly useful in reservoirs with high temperatures, variable temperatures, and/or high concentrations of inorganic salts.

In the practice of this invention, an aromatic feedstock for making alkylaryl sulfonates is obtained by sulfolane extraction of a naphtha product taken directly from a naphtha reformer unit used in conventional crude oil refining processes. This feedstock fraction ("AXU Aromatics") consists essentially of a mixture of benzene, toluene, xylenes, and lesser amounts of ethylbenzene and $C_9$ to $C_{10}$ aromatics. The proportions of the AXU Aromatics will obviously vary with different naphtha streams. However, it is important in achieving the benefits of this invention to use a purified aromatic mixture consisting essentially of benzene, toluene and xylenes, with lesser amounts of ethylbenzene, trimethylbenzenes and tetramethylbenzenes. The invention does not depend upon the exact proportions of the components making up the AXU Aromatic feedstock, but upon the fact that a purified mixture of the identified aromatic compound is used. The composition of a typical fraction, taken from a refinery, is given in Table I.

TABLE I

| Aromatic Feedstock Composition | |
|---|---|
| Component | Percent Weight |
| Benzene | 15.02 |
| Toluene | 32.09 |
| Ethylbenzene | 8.32 |
| Xylenes | 36.05 |
| $C_9$ (Trimethylbenzenes) | 7.49 |
| $C_{10}$ (Tetramethylbenzenes) | 1.03 |

The AXU Aromatics are alkylated using commercially available linear α-olefins ($C_6$–$C_{20}$) under conventional Friedel-Crafts alkylation conditions. These alkylates are hereinafter referred to as "AXU Alkylates". Alkylaryl sulfonates are prepared from these AXU Alkylates by $SO_3$ sulfonation followed by base neutralization. As noted previously, these alkylaryl sulfonates are referred to as "AXU Sulfonates". The particular manner of conducting these reactions is generally known in the art. As will become apparent below, the present invention does not depend on the particular reaction conditions, but upon the unique properties of the resulting surfactant in enhanced oil recovery.

In laboratory experiments, AXU Sulfonates demonstrated superior qualities as surfactants for use in enhanced oil recovery. Relative to state-of-the-art alkylaryl sulfonates, these qualities include insensitivity to temperature, high optimal salinities and high solubilization parameters. Comparing surfactants by their solubilization parameters and optimal salinities and the determination of such parameters and salinities are methods known to those experienced in the art. Basically, the methods recognize that whenever water, an oil, and a surfactant equilibrate at concentrations of surfactant in excess of critical micelle concentrations, one or more microemulsions form. All surfactant flooding processes may involve microemulsions in situ. A microemulsion may be defined as a stable (at equilibrium), translucent micellar solution of oil, water that may contain electrolytes, and one or more amphiphilic compounds such as surfactants. As salinity increases, the amount of oil dissolved in the surfactant increases, the amount of water dissolved in the surfactant decreases and vice versa. At the point where the amount of water dissolved in the surfactant is equal to the amount of oil dissolved in the surfactant, there is the lowest surface tension between both the microemulsion and the oil and between the microemulsion and the water. It is at this point that the maximum oil recovery from a surfactant flood may be achieved. This point occurs at, and is known as, the "interfacial tension optimal salinity" for the surfactant. For a detailed discussion of the estimation of optimal salinity and solubilization parameters for a hydrocarbon sulfonate, see R. N. Healy, R. L. Reed, and D. G. Stenmark, "Multiphase Microemulsion Systems," *Society of Petroleum Engineers Journal*, pages 147–160, June, 1976. For additional discussion on microemulsions, see the article by R. N. Healy and R. L. Reed entitled "Physiochemical Aspects of Microemulsion Flooding" published in the October 1974 volume of the *Society of Petroleum Engineers Journal* at page 491; also see the chapter entitled "Some Physicochemical Aspects of Microemulsion Flooding: A Review" by R. L. Reed and R. N. Healy in *Improved Oil Recovery by Surfactant and Polymer Flooding* published by the Academic Press, Inc. in 1977.

These surfactants find greatest application in high temperature (120°–250° Fahrenheit) and/or high salinity reservoirs, because their surface-active properties are essentially independent of temperature at these temperatures. This is of key importance for use with microemulsions as applied to enhanced oil recovery.

Although the general method for injecting microemulsions and recovering crude oil will be known to those skilled in the art, a brief review is illustrative. In practice, a microemulsion is first injected into the subterranean formation in the form of a slug followed by the injection of thickened water and thereafter unthickened water. The slug of microemulsion is injected into the subterranean formation in a quantity selected to be large enough to effectively displace the crude oil in the formation to one or more production wells. Those skilled in the art can determine the volume to be injected. The thickened water which is injected after the slug of microemulsion can be any conventional thickened water used as a driving fluid in microemulsion flooding processes. Following the injection of thickened water, unthickened water is injected as a flooding medium. Any of these fluids can contain the surfactants of the present invention. The thickened and unthickened water act as driving fluids to drive the microemulsion slug through the subterranean formation and the microemulsion slug displaces crude oil trapped therein. The displaced oil is driven to the production means and then to the surface of the earth.

The superiority of "AXU Sulfonates" over conventional alkylaryl sulfonates used in enhanced oil recovery may best be understood by looking at the actual data below.

SURFACTANT PREPARATION

To prepare the alkylaryl sulfonates known herein as AXU Sulfonates, a naphtha feedstock was taken from a refinery located in Baytown, Tex., and extracted with sulfolane (also known as tetrahydrothiophene or tetramethylsulfone), an inert compound for separating aromatic components from saturated compounds. Any solvent capable of selectively extracting the aromatic components in question could be used, however, e.g. $SO_2$ or tetrahydrofuran. The resulting extracted aromatic fraction had the composition listed in Table I above. A portion of the extracted aromatic fraction, known herein as AXU Aromatics, was placed into a glass reaction flask. Anhydrous aluminum chloride was added to the liquid AXU Aromatics as the Friedel-Crafts alkylation catalyst. The contents of the flask were then cooled to between 0°–10° Centigrade. Commercially available, linear α-olefins ($C_6$–$C_{20}$) were added dropwise to the stirred AXU Aromatics/catalyst mixture so that the reaction temperature was not allowed to exceed 10° Centigrade during the course of the alkylation reaction. The ratio of aromatics to olefins was within a range of 4/1 to 7/1. The concentration of catalyst was within the range of 5–10 weight percent of the olefins added. Reaction digestion time was 20 minutes although up to 60 minutes would have been permissible.

Following the olefin addition, the reaction product was washed with water to remove the catalyst and then fractionated by distillation. Unalkylated aromatics and any trace light alkylates were removed as distillate overhead. The distillation was monitored by periodically analyzing the overhead fractions by gas chromatographic analysis. The product alkyl aromatics, or AXU Alkylates as they are known herein, were taken from a distillate fraction, but they could have been taken as the distillation bottoms. The composition of these AXU Alkylates is listed below in Table II.

TABLE II

Composition of Alkylates prepared from the AXU Aromatics in Table I

| Component, Mole % | C12 | C14 | C16 |
|---|---|---|---|
| Benzene | 9.03 | 7.22 | 11.71 |
| Toluene | 26.74 | 23.44 | 28.02 |
| E-Benzene | 6.40 | 6.55 | 7.08 |
| P—Xylene | 7.39 | 7.83 | 7.62 |
| M-Xylene | 30.94 | 34.14 | 26.08 |
| O—Xylene | 11.22 | 15.24 | 11.98 |
| C9-Benzenes | 6.63 | 4.13 | 6.55 |
| C10-Benzenes | 1.66 | 1.46 | 0.95 |
| Average Alkylate Molecular Weight | 269.58 | 298.15 | 324.59 |

The AXU Alkylates were then each treated with gaseous $SO_3$ in a continuous bench scale gas-liquid reactor which converted the alkylates to the corresponding sulfonic acid. The mid-reactor temperature was within the range of 4°–8° Centigrade and the mole ratio of $SO_3$ to alkylate was within the range of 1.15 to 1.13. The sulfonic acid products were neutralized with 50% caustic to form the sodium sulfonates which are known herein as the AXU Sulfonates.

An AXU Sulfonate is largely a sulfonated mixture of benzene, toluene, and xylene compounds which have linear alkyl chains attached at various carbons but favoring a high degree (e.g. 70%) of second carbon attachment. The Sulfonates may be descriptively referred to as "bi-linear" because of the attachment distribution of the alkylate.

SURFACTANT EVALUATION

For evaluation of the AXU Sulfonates' effectiveness as surfactants in enhanced oil recovery, the solubilization parameters and optimal salinities of the AXU Sulfonates were determined with various oils and temperatures by methods known to those skilled in the art; see the references cited herein on microemulsions and also U.S. Pat. No. 4,271,907, incorporated by reference. Similar properties were determined for conventional sulfonated surfactants. FIG. 1 shows a plot of such laboratory data of one AXU Sulfonate, bi-linear $C_{12}$ AXU Sulfonate, prepared by the process described above. For comparison to surfactants known and used in the art, the plot also depicts laboratory data, taken under the same laboratory conditions as used with the AXU Sulfonate, for bi-linear-$C_{10}$ orthoxylene sulfonate (bl-C10 OXS.Na) and bi-linear-$C_{12}$ orthoxylene sulfonate (bl12 OXS.Na). More specifically, FIG. 1 shows a plot of laboratory data for the optimal salinities by weight percent NaCl for the three sulfonates in solubilizing different kinds of oils. The abbreviation "SURF/SBA" means the ratio of surfactant to sec-butyl alcohol, a cosolvent used in preparing the surfactant/oil/water solutions (microemulsions). The actual oils tested were hexane, octane, decane, do-decane and tetra-decane. Solubilization parameters and optimal salinities were determined at four temperatures: 78°, 110°, 140°, and 200° Fahrenheit. Solubilization parameters are shown in FIG. 1 in parentheses near the corresponding plotted point for optimal salinity.

The data shows that the AXU Sulfonates have superior, high oil solubilization parameters over a wide, high temperature range (140°–200° Fahrenheit), and phase behavior which does not significantly vary over this range i.e., the optimal salinities remain substantially equivalent. The single line in FIG. 1 for the AXU Sulfonate indicates that surfactants of the present invention are not affected by temperature, over a 140°–200° Fahrenheit range. The conventional alkylaryl sulfonates, at conditions of high oil solubilization parameters, varied widely in a low temperature range. At high temperatures, the oil solubilization parameters were so low as to be completely unacceptable. The increase in optimal salinity of the conventional surfactants with increased temperatures, accompanied by completely unacceptable reduction in solubilization parameters, typifies the known problems with using hydrocarbon sulfonates as surfactants for enhanced oil recovery. At the high temperatures often found in reservoirs, state-of-the-art surfactants lose "surface activity," or as it is more technically expressed, their solubilization parameters decrease so much that the surfactants lose most of their effectiveness.

The solubilization parameters for the AXU sulfonate were higher at the lower temperature, but were very good at both temperatures tested. The solubilization parameter range for the AXU Sulfonates, from 11.2 to 33.2 at 140°–200° Fahrenheit, was superior (even at lower temperatures) to those of the conventional sulfonates tested. The conventional sulfonates had solubilization parameters ranging from 3.4 to 21.5 at 78°–140° Fahrenheit, but only 3.4 to less than 14.5 at 140° Fahrenheit. Also, the solubilization parameters for the AXU Sulfonate were good over a broad range of oils. The sulfonates known in the art could not effectively solubilize oils from as broad a range.

The high optimal salinity shown for the AXU Sulfonate in FIG. 1 indicates that the AXU Sulfonate will be an effective surfactant for enhanced oil recovery in high salinity reservoirs. The data indicate that good phase behavior can be obtained with the AXU Sulfonate in reservoirs with sodium chloride or other ionic salt concentrations as great as 7 percent by weight. By contrast, the conventional sulfonates could be used, at best, in reservoirs having no more than about 1% salinity at the temperatures in question. And, these conventional surfactants simply could not be used economically at temperatures greater than 110° Fahrenheit.

Figure 2:
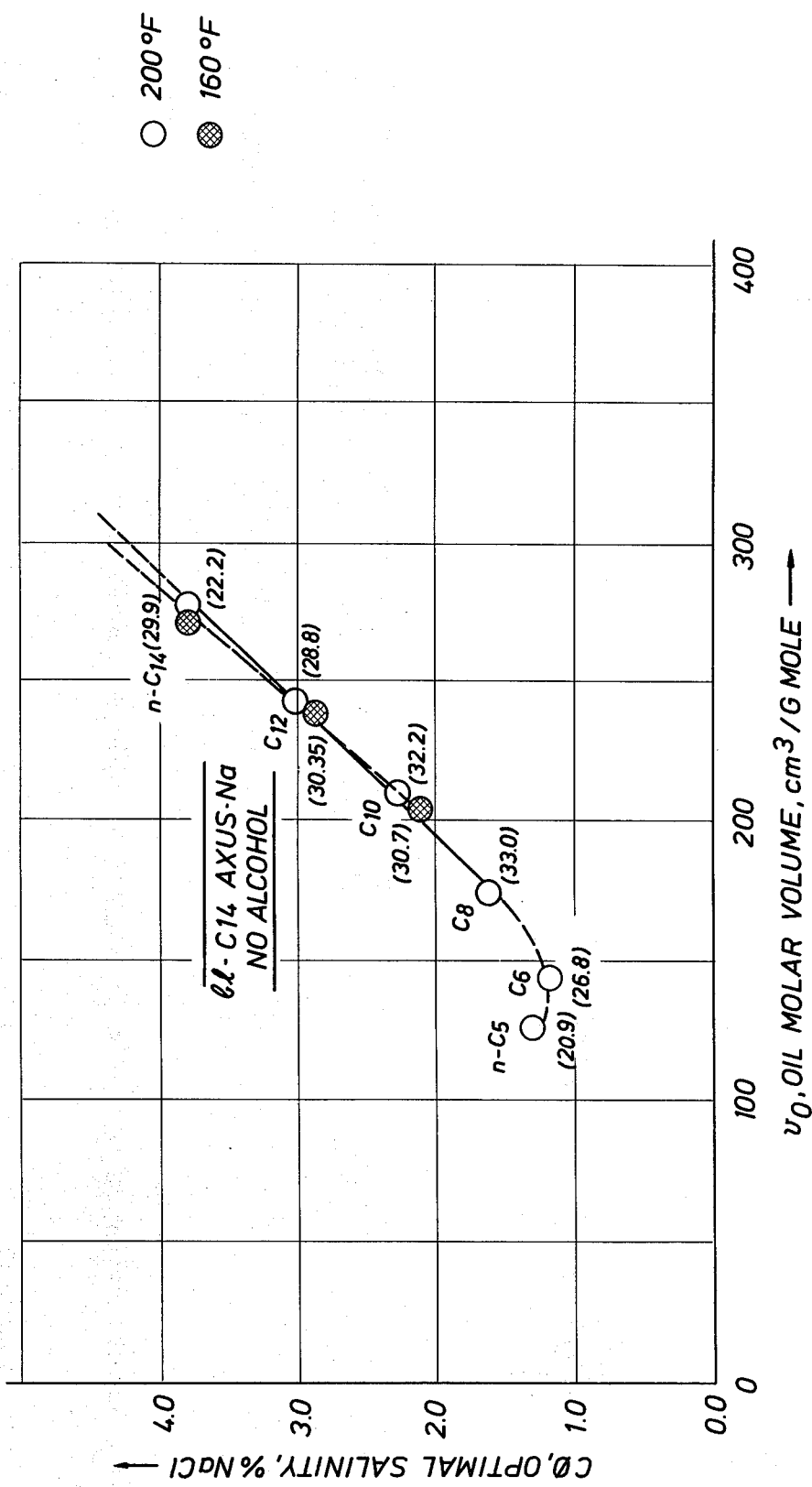
FIG. 2 is a plot illustrating the optimal salinities and solubilization parameters of another AXU Sulfonate for a range of oils of increasing molecular weight (from pentane to tetradecane) at 200° Fahrenheit.

FIG. 2 plots the optimal salinity for another AXU Sulfonate, prepared by the process described above. This sulfonate is bi-linear $C_{14}$ AXU Sulfonate. The Sulfonate was studied solubilizing a number of different oils (pentane, hexane, octane, decane, do-decane, and tetra-decane) at 200° Fahrenheit. Again, high solubilization parameters, high optimal salinities, and applicability to a broad range of oils were observed.

While not wishing to be bound by theory, it is believed that unexpected synergistic combination is achieved with the AXU Sulfonates for use in enhanced oil recovery because of (1) alkylating a purified aromatics fraction with (2) linear α-olefins such that (3) a high degree of attachment of the alkyl chain's second carbon to the aromatic ring occurs. An illustrative structure of a component believed to give the superior properties, when sulfonated, is:

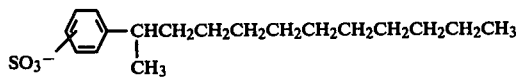

which would be one component in the AXU Aromatic fraction used to prepare bi-linear $C_{12}$ AXU Sulfonate. The resulting AXU Sulfonates have superior surface-active properties over a high temperature range, e.g. 120°–250° Fahrenheit.

The principle of the invention and the best mode contemplated for applying that principle have been described. It is to be understood that the foregoing is illustrative only and that other means and techniques can be employed without departing from the true scope of the invention defined in the following claims.

We claim:

1. A method of recovering crude oil from a subterranean reservoir which comprises
   (a) injecting into said reservoir an aqueous fluid containing an effective amount of alkylaryl sulfonate surfactant prepared by
      (i) alkylating a purified mixture of aromatic compounds consisting essentially of benzene, toluene, xylenes, and lesser amounts of ethylbenzene, trimethylbenzenes, and tetramethylbenzenes derived from a naphtha stream; and
      (ii) sulfonating the resulting alkylated aromatic product;
   (b) driving said fluid through said reservoir to displace oil from said reservoir; and
   (c) recovering the displaced oil.

2. The method of claim 1 wherein said mixture is alkylated using linear α-olefins.

3. The method of claim 2 wherein said linear α-olefins have from between 6 and 20 carbon atoms.

4. The method of claim 1 wherein said alkylating step is a Friedel-Crafts alkylation which favors attachment of an alkyl chain's second carbon to said mixture.

5. The method of claim 1 wherein said surfactant has oil solubilization parameters greater than about 11 over a temperature range of 140°–200° Fahrenheit.

6. The method of claim 1 wherein said surfactant has substantially the same optimal salinity over a temperature range of 140°–200° Fahrenheit for a given hydrocarbon oil.

7. The method of claim 1 wherein said surfactant has substantially the same phase behavior over a temperature range of 140°–200° Fahrenheit.

8. The method of claim 1 wherein said mixture is alkylated to add a linear alkyl chain having from 6 to 20 carbon atoms in a manner which favors attachment of said chain to an aromatic ring at the chain's second carbon atom.

9. A method of recovering crude oil from a subterranean formation having temperatures in the range 120°–250° Fahrenheit which comprises displacing the crude oil to a production well with a microemulsion comprising an oil, water, and an effective amount of an alkylaryl sulfonate surfactant prepared by alkylating, with linear α-olefins having from 6 to 20 carbon atoms under Friedel-Crafts conditions, a purified mixture of aromatic compounds consisting essentially of benzene, toluene, xylenes, and lesser amounts of ethylbenzene, trimethylbenzenes and tetramethylbenzenes derived from a naphtha stream and sulfonating the resulting product.

10. The method of claim 9 wherein said surfactant has substantially the same optimal salinity over a temperature range 140°–200° Fahrenheit for a given hydrocarbon oil.

11. The method of claim 9 wherein said mixture of aromatic comounds is alkylated with a single, linear α-olefin having from 12 to 14 carbon atoms.

12. An enhanced oil recovery surfactant characterized by having optimal salinities which are substantially independent of temperature over the range 120°–250° Fahrenheit for given hydrocarbon oils and oil solubilization parameters greater than about 11 over said temperature range, the surfactant resulting from
   (a) alkylating a mixture of aromatic compounds consisting essentially of benzene, toluene, xylenes, and lesser amounts of ethylbenzene, trimethylbenzenes, and tetramethylbenzenes under Friedel-Crafts conditions with a linear $C_6$–$C_{20}$ α-olefin; and,
   (b) sulfonating the product of step (a).

13. A microemulsion comprising an oil, water, and surfactant of claim 12.

* * * * *